United States Patent [19]

Cunningham

[11] Patent Number: 5,596,578
[45] Date of Patent: Jan. 21, 1997

[54] TIME DIVISION MULTIPLEXING DATA TRANSFER SYSTEM FOR DIGITAL AUDIO DATA DISTRIBUTION

[75] Inventor: Jeffrey Cunningham, Hanover, N.H.

[73] Assignee: Fostex Corporation of America, Norwalk, Calif.

[21] Appl. No.: 131,997

[22] Filed: Oct. 4, 1993

[51] Int. Cl.$^6$ .............................. H04J 3/26; H04L 12/40
[52] U.S. Cl. .............................................................. 370/364
[58] Field of Search ................................ 370/85.11, 85.1, 370/85.2, 85.7, 85.9, 85.13, 95.1, 93, 92, 85.6, 95.2, 95.3, 94.1, 96.2, 62; 364/130, 131; 340/825.52, 825.53; 379/197, 198, 202

[56] References Cited

U.S. PATENT DOCUMENTS

| | | | |
|---|---|---|---|
| 3,963,870 | 6/1976 | Louder et al. | 370/85.11 |
| 4,135,156 | 1/1979 | Sanders, Jr. et al. | 370/57 |
| 4,740,955 | 4/1988 | Litterer et al. | 370/85.11 |
| 4,843,606 | 6/1989 | Bux et al. | 370/85.4 |
| 4,870,641 | 9/1989 | Pattavina | 370/60 |
| 5,043,981 | 8/1991 | Firoozmand et al. | 370/85.1 |
| 5,051,986 | 9/1991 | Grow et al. | 370/85.5 |
| 5,095,480 | 3/1992 | Fenner | 370/94.1 |
| 5,276,678 | 1/1994 | Hendrickson et al. | 370/62 |
| 5,343,475 | 8/1994 | Matsuda et al. | 370/94.1 |
| 5,384,776 | 1/1995 | Gulliford et al. | 370/85.1 |

OTHER PUBLICATIONS

Digital Design with Standard MSI and LSI by Thomas R. Blakeslee Section 11.1, p. 261, 1979.
Advanced Digital Audio, by Ken C. Pohlmann, 1991 Howard Sams, pp. 271–273.
Dictionary of Music Production and Engineering Terminology by Wayne Wadhams, 1988 Schirmer Books, pp. 147 and 165.
Hardware Design of a Digital Mixer for Musical Applications by Marie–Dominque Baudot, Waveframe Corporation, Oct. 1987.

*Primary Examiner*—Wellington Chin
*Assistant Examiner*—Huy D. Vu
*Attorney, Agent, or Firm*—Kenneth L. Sherman, Esq.; Sherman & Sherman

[57] ABSTRACT

A time division multiplexing (TDM) digital audio signal processing and communication system is disclosed. The preferred embodiment applies time division multiplexing to a digital audio data transfer environment by providing a TDM patch bay bus structure to which digital audio devices can be plugged into and digital audio data transfer connections made. In the preferred embodiment, the patch bay bus structure includes the bus connection structure, a bus controller and a plurality of digital audio processing devices which each communicate with the bus structure which uses three (3) separate buses: A data bus, control bus and an address bus. Each processing device not only has its own unique address, but also one or more group addresses. Thus, the system allows communication to single recipient devices or multiple recipient devices in one time slice of the TDM signal. Each destination device will activate to receive data from the indicated source device if either its destination address, or the destination address of a group to which it belongs is called. This allows a signal to be sent to one address or to multiple addressed locations during a single time slot of the TDM signal.

19 Claims, 6 Drawing Sheets

TIME DIVISION MULTIPLEXING DATA TRANSFER SYSTEM FOR DIGITAL AUDIO DATA DISTRIBUTION

FIELD OF THE INVENTION

The present invention relates generally to digital system interconnection for transferring data and, more specifically, to an improved system for transferring digital audio data signals between digital audio processing devices.

BACKGROUND OF THE INVENTION

Recording engineers use a central routing terminal, commonly known as "patch bay" or "jack bay" to interconnect electrical input and output signals being transferred between audio equipment in a flexible manner. Using a patch bay, an audio engineer can avoid "hard wiring" equipment components directly together. Instead, "patch cords" connect "jacks" which are the connecting points for the input or output of each components. A patch bay allows the audio engineer to configure and reconfigure the components connections in a custom manner for each project.

Wadhams, *Dictionary of Music Production and Engineering Technology* 165 (1988) defines a patch bay as, one or more rows of female input and output jacks, used in conjunction with patch cords to route signals through outboard processing gear, or to reroute signals inside the console itself.

Traditional patch bays route signals from a single source to a single destination or in certain circumstances route a single signal from a single source to multiple destinations. The ability of a patch bay to route a single signal output to multiple inputs is called a "multiple" or just "mult" for short.

Wadhams, supra at 147, defines a multiple as, a group of jacks in the patch bay that are connected in parallel. A line-level signal patched into any of these jacks can then be sent to more than one destination by patching from the other jacks into separate devices or inputs. The original signal is thus multiplied or replicated for various uses. Often called a mult for short.

Figure 6:
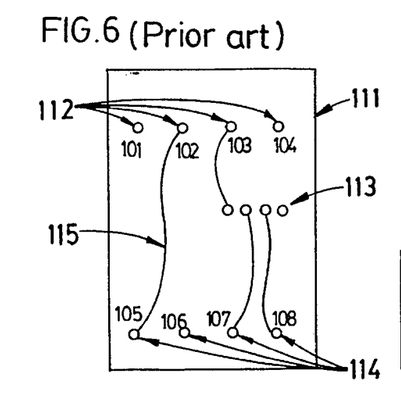
FIG. 6 is an illustrated diagram of a conventional analog patch bay.

FIG. 6 is an illustration of a conventional patch bay 11. The patch bay 11 has four output jacks 112 connected to the outputs of pieces of audio gear (not shown), a four jack mult connection 113 (four jacks wired in parallel) and four input jacks 114 connected to the inputs of audio gear (not shown). In the diagram, patch cords 115 are shown connecting output jack 102 to input jack 105 and output jack 103 to input jacks 107 and 108 using the "mult" facility.

Time division multiplexing, hereinafter "TDM" is a method to transmit multiple channels of information over a single communications medium or channel. TDM divides time into small "slices" and uses the single medium to serially connect consecutive channels of information during consecutive slices of time. The principles of TDM are discussed by Blakeslee, T., *Digital Design With Standard MSI and LSI*, 261–262 (2nd ed. 1979).

Figure 7:
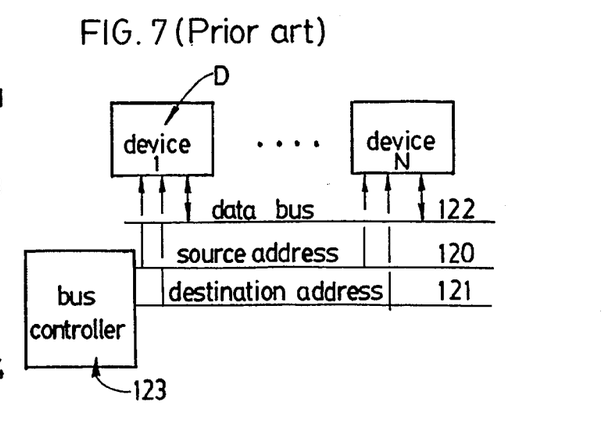
FIG. 7 is a block diagram illustration of a collection of digital devices connected in a conventional bus arrangement.

FIG. 7 shows a collection of digital devices connected in a conventional bus transfer arrangement which uses time division multiplexing. In FIG. 7, source address bus 120 defines the source of data and the destination address bus 121 indicates which device D should receive the data. A data bus 122 provides the path for the actual data transfer. A bus controller 123 puts out a series of source and destination addresses to perform the desired signal routing.

Figure 8:
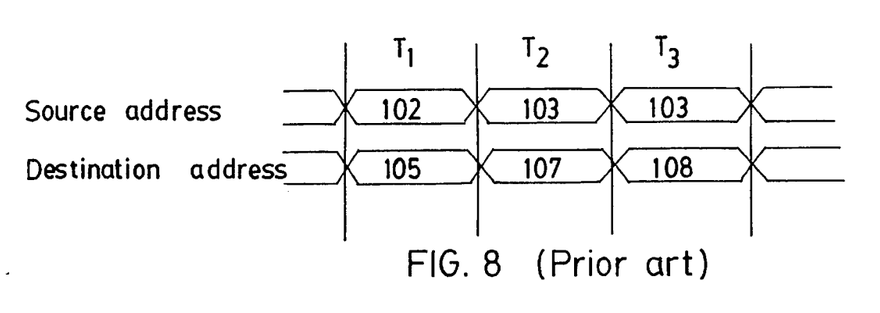
FIG. 8 is a functional timing diagram illustrating how conventional time division multiplexing works.

FIG. 8 is a functional timing diagram showing how conventional time division multiplexing works. During the first time slice T1, device 102 transfers data to device 105, then in the next slice T2, device 103 transfers data to device 107, and finally during T3, device 103 transfers data to device 108.

The TDM technique has been used in audio engineering to transmit digitally configured audio signals by packing multiple channels of audio data on a single satellite data channel. This is described by Pohlman, K., *Advanced Digital Audio*, 271–276 (1991).

Bandot, Marie-Dominique, *Hardware Design of a Digital Mixer for Musical Applications*, Audio Engineering Society, 1987, further describes a digital mixer using time division multiplexing.

OBJECTS OF THE INVENTION

It is therefore an object of the present invention to apply time division multiplexing in a digital audio data transfer patch bay environment.

It is yet a further object of the present invention to provide a time division multiplexing system which allows multiple destination devices to receive data during a single time slice.

It is a still further object of the present invention to provide an enhanced addressing capability within time-division-multiplexing which provides the capabilities to perform all the functions of a conventional patch bay.

It is yet even a still further object of the present invention to utilize TDM bus bandwidth in a more efficient manner suitable for audio data distribution.

It is yet even a still further object of the present invention to enhance the TDM addressing in a way that allows all the N connections of a "multiple" connection to take place in a single time slot instead of N time slots.

SUMMARY OF THE INVENTION

These and other objects of the present invention are achieved by providing a time division multiplexing (TDM) digital audio signal processing and communication system.

The preferred embodiment of the present invention applies time division multiplexing to a digital audio data transfer environment by providing a TDM patch bay bus structure to which digital audio devices can be plugged into and digital audio data transfer connections made. In the preferred embodiment, the patch bay bus structure includes the bus connection structure, a bus controller and a plurality of digital audio processing devices which each communicate with the bus structure.

In the preferred embodiment, the bus controller provides a single address coding control signal having one source address and one destination address for signal routing. Each time slot corresponds to a single data pack to be transferred along the data bus during that time slot. The preferred embodiment uses three (3) separate buses: A data bus, control bus and an address bus.

In the preferred embodiment of the invention, each processing device not only has its own unique address, but also one or more group addresses. Thus, the system allows communication to single recipient devices or multiple recipient devices in one time slice of the TDM signal. Any device on the bus that can receive data, will take in data if it sees its own unique address OR the address of any group to which it belongs.

Each destination device will activate to receive data from the indicated source device if either its destination address, or the destination address of a group to which it belongs is called. This allows a signal to be sent to one address or to multiple addressed locations during a single time slot of the TDM signal.

BRIEF DESCRIPTION OF THE DRAWINGS

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
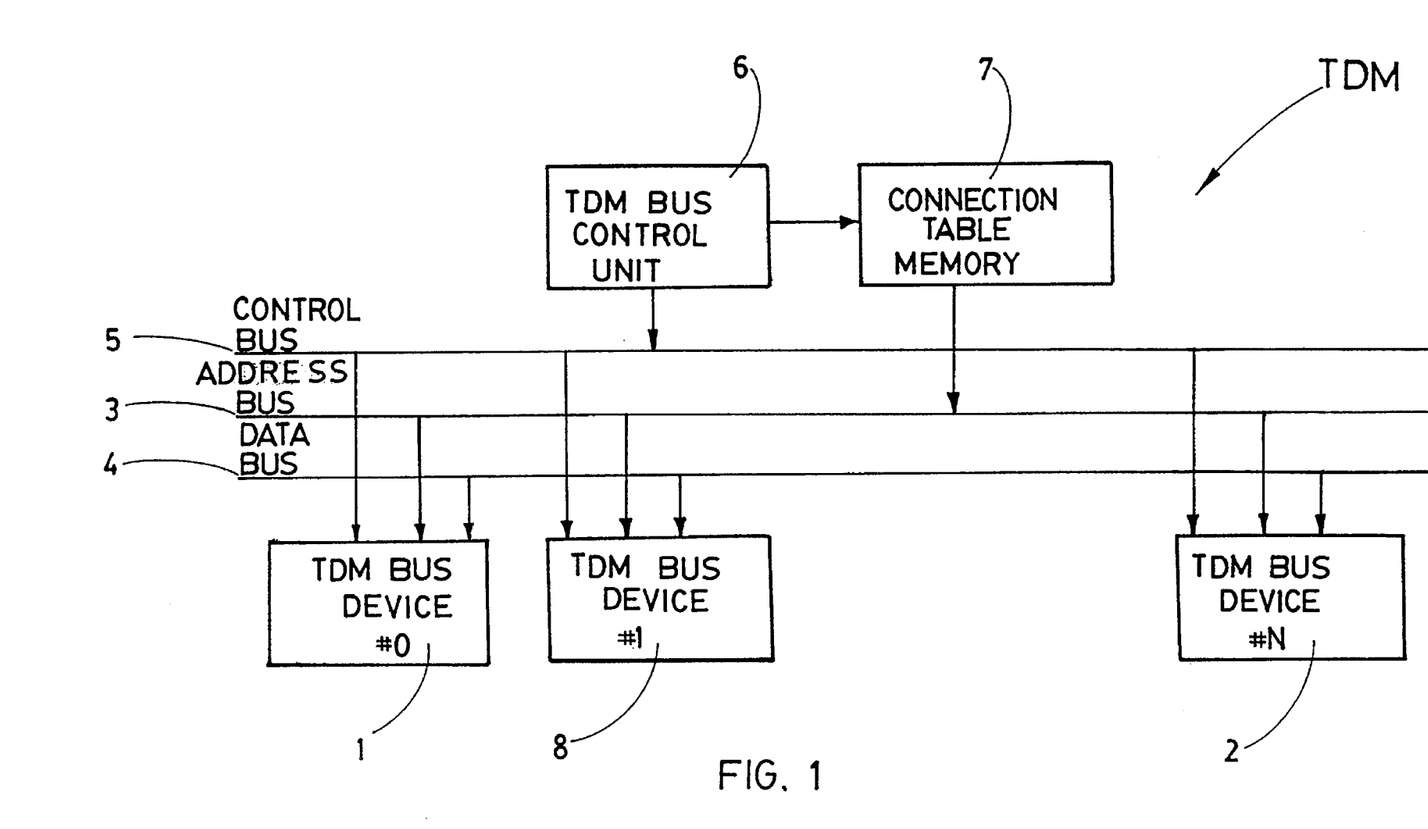
FIG. 1 is a block diagram illustration of the TDM bus structure of the preferred embodiment of the present invention.

FIG. 1 is a block diagram illustration of the overall topology of a time division multiplex bus constructed according to the preferred embodiment of the present invention. As shown in FIG. 1, multiple TDM bus digital processing devices 1, 2 & 8 are connected to a control bus 5, an address bus 3 and a data bus 4.

The control bus 5 communicates signals which provide precise timing references and control signals to orchestrate the movement of address information and user data throughout the system. These timing references and control signals are generated and communicated to the control bus 5 by TDM bus control unit 6.

A connection table memory 7 contains address information for the source and destination of each time slot on the TDM bus TDM illustrated in FIG. 1. The TDM bus control unit 6 and connection memory 7 orchestrate all transfers over the TDM bus TDM. During each time slot, one TDM bus device 1, 2 or 8 acts as the source of a transaction, putting data on the data bus TDM. Simultaneously, one or more of the other TDM bus devices 1, 2 or 8 act as the destination of the transfer, reading the data off of the data bus 30.

Figure 2:
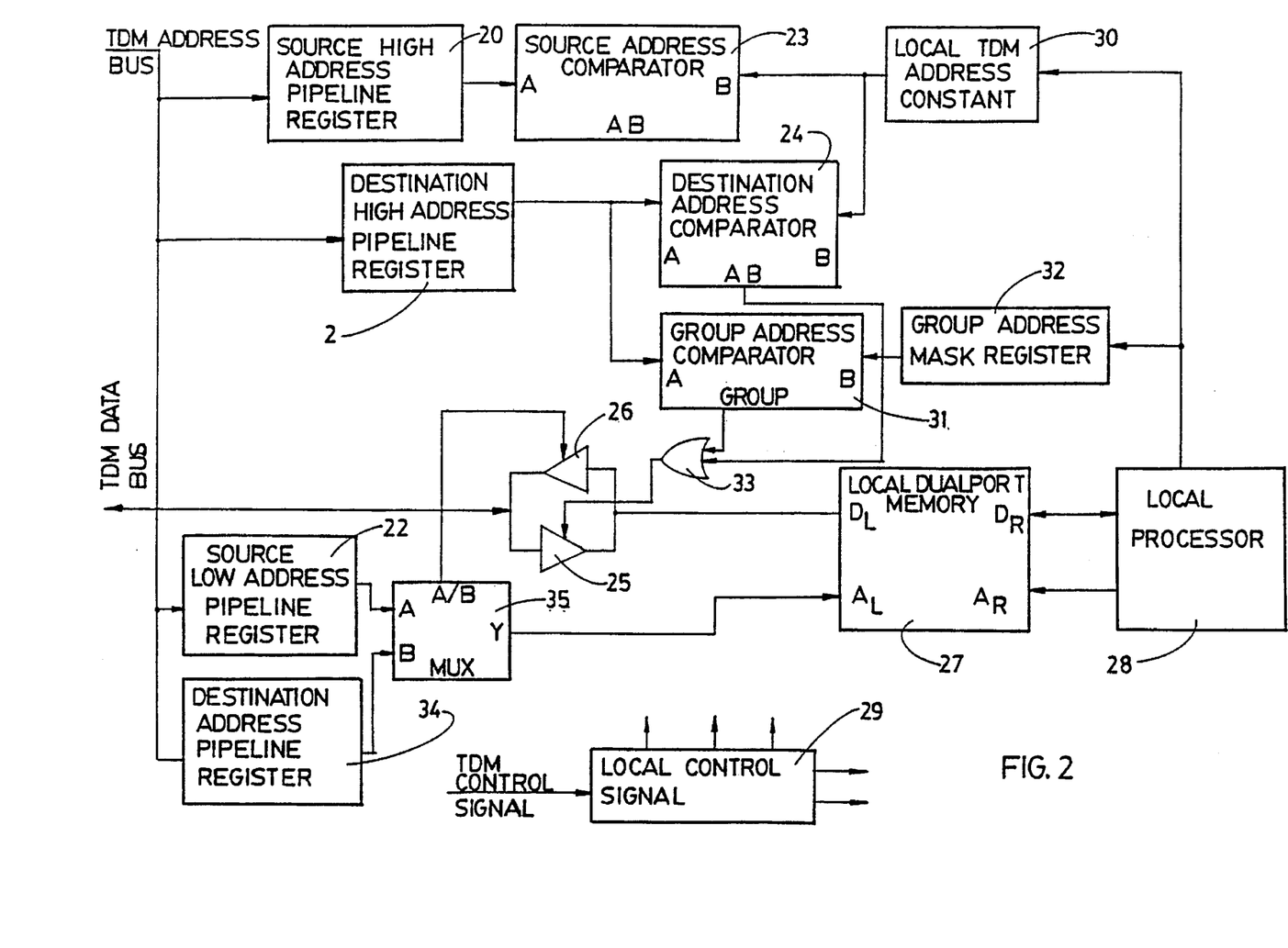
FIG. 2 is a block circuit diagram of the internal details of one TDM bus device used in the preferred embodiment of the present invention.

FIG. 2 is a block diagram illustration of the internal circuitry of one of the TDM bus devices 1, 2 or 8 used in the preferred embodiment of the present invention.

As shown in FIG. 2, the TDM bus devices 1, 2 or 8 of the preferred embodiment use two pairs of address pipeline registers to determine transmission or reception of data. High address pipeline registers 20, 21 receive coding from the address bus 3 to determine when the TDM bus device 1, 2 or 8 itself is accessed for data communication. High address pipeline registers 20, 21 access the higher order bits on the address bus 3 (illustrated in FIG. 3). Low address pipeline registers 22, 34 receive coding from the address bus 3 to determine where the TDM bus device 1, 2 or 8 is to access the user data to or from. Low address registers 22, 34 access the lower order bits on the address bus 3.

Source high address pipeline register 20 holds the address as a source device to send information. Destination high address pipeline register 21 holds the address coding when the TDM bus device or devices 1, 2 or 8 will be a destination device on the TDM bus. Source low address pipeline register 22 holds address coding of the data within the TDM bus device 1, 2 or 8 that is the source. Destination low address pipeline register 34 holds the address within the TDM bus device 1, 2 or 8 of the destination of the data transfer.

In order to determine where within the TDM bus device 1, 2 or 8 to access for data transfer, a multiplexer 35 selects one or the other of the low address values from low address pipeline registers 22,34 to use internally, depending on whether the TDM bus device 1, 2 or 8 is the source device or a destination device.

In the preferred embodiment, each pipeline register 20, 21, 22 or 34 consists of two actual registers (not shown) connected in series. Each actual register has an independent enable input which allows a coordinated delayed transfer from one to the other. To determine if the TDM bus device 1, 2 or 8 is the source device, the source address comparator 23 compares the source address to the coding held in the local TDM address constant 30. The local TDM address constant 30 is a preprogrammed register that holds the unique device address of that particular TDM bus device 1, 2 or 8.

In order to allow the TDM bus device 1, 2 or 8 to act as one of a plurality of destinations to simultaneously receive data during a single time slice, the group address comparator 31 indicates whether the destination device address coding received from the TDM address bus 3 is a group address to which that particular TDM bus device 1, 2 or 8 belongs. The group address mask register 31 holds coding which indicates which broadcast groups the TDM bus device 1, 2 or 8 belongs to.

Buffers 25 and 26 control the flow of data between the TDM data bus 4 and the local dualport memory 27. One port $D_L$ of the dualport memory 27 connects to the TDM data bus 4 while the other port $D_R$ connects to the local processor or communications channel 28.

The local processor performs computations on data it has received (when being addressed as a destination device) or puts the results in other dualport locations for transfer to other TDM bus devices (when addressed as the source device). If the local processor 28 has communication duties, it will take "destination" data it receives and send that data to audio devices in the outside world over various communication channels (not shown) and visa versa.

To control the entire addressing system, the local control signal generator 29 is driven from the control bus 5. The local control signal generator 29 creates the local clock and enable signals that coordinate the internal operation of the TDM bus device 1, 2 or 8.

Figure 3:
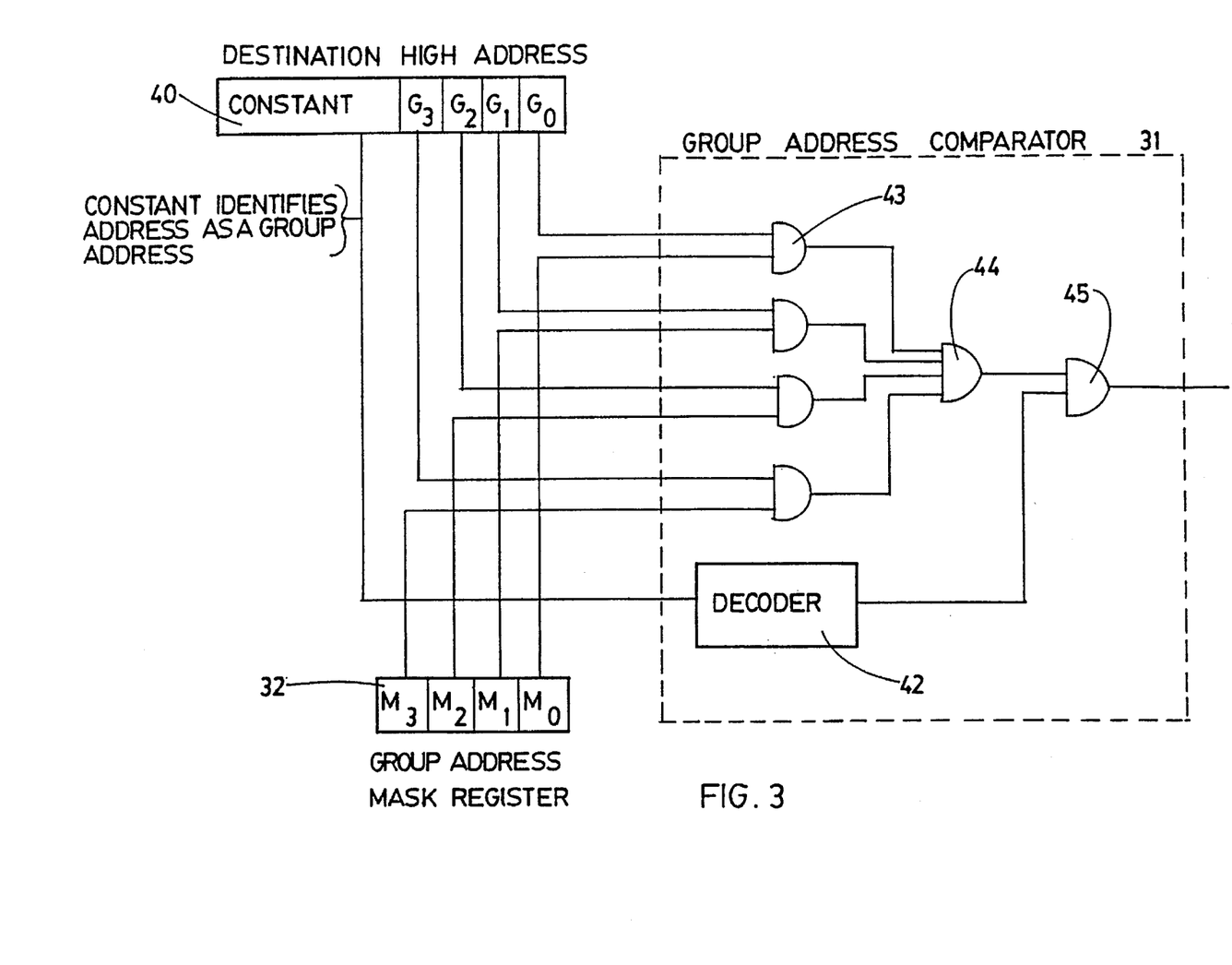
FIG. 3 is a block diagram illustration of the internal circuitry and operation of the group address comparator of FIG. 2.

FIG. 3 is a block diagram illustration of the internal details of the group address comparator 31 of FIG. 2 and shows how the group address comparator 31 recognizes group addresses. As shown in FIG. 3, a group address 40 is indicated by a specific value in the high bits of an address coding on address bus 3 that signify that the destination high address 40 is a group address. The group address comparator 31 contains a decoder 42 that determines if the destination high address 40 is a group address. Each of the lower bits G0, G1, G2, G3 of the destination high address 40 represents a specific group.

Four possible group addresses are shown in this illustration. If bit G0 is set, group 0 is addressed, if G1 is set, group 1 is indicated, etc. As can be seen, more than one group may be addressed at the same time.

The group address mask register 32 has four bits M0, M1, M2, M3 that correspond to the four group address bits G0, G1, G2, G3. If the local device is to be included in a particular group, the mask bit associated with that group is set.

Any of the four AND gates 43 will output a "1" if the corresponding mask M and group G bits are set. This "1" is passed through the OR gate 44 and ANDed with the output of the decoder 42 in another AND gate 45. In this way, the group address comparator 31 recognizes the group addresses received from the address bus 3 for which the corresponding bits in the group address mask register are set.

Figure 4:
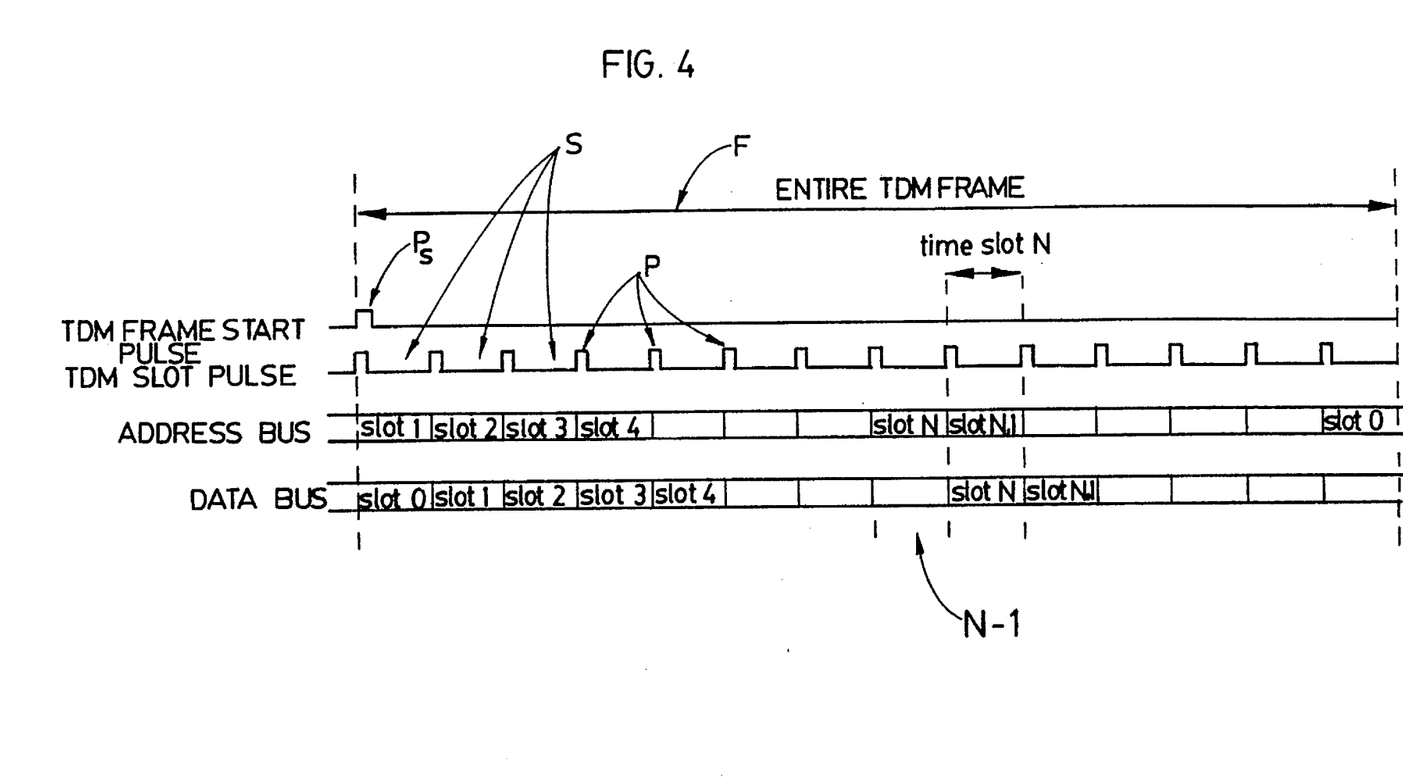
FIG. 4 is a timing diagram showing the overall TDM bus timing and data transfer in the preferred embodiment of the present invention.

FIG. 4 is a timing diagram that shows the overall operation of the TDM bus TDM. Each TDM frame contains a fixed number of time slots S.

In the preferred embodiment of the present invention, the address information received from address bus 3 is pipelined such that the value on the address bus 3 "leads" the corresponding information on the data bus by one TDM time slot S. For instance, when data bus 4 is being used to transfer data during slot N, the address bus 3 is simultaneously carrying the address information for the upcoming slot N+1.

As can be understood, any address information on the address bus 3 consists of a source address and a destination address. As discussed above, the higher bits of the address specify a particular TDM bus device 1, 2 or 8 and the lower bits of the address specify a memory location within that particular TDM bus device 1, 2 or 8. During a TDM time slot S, a source device 1, 2 or 8 places data onto the data bus 4 while the destination device 1, 2 or 8 reads the value on the data bus 4.

One aspect of the preferred embodiment describes a way for more than one TDM bus device 1, 2 or 8 to receive the data off of the data bus 4. In other words, more than one destination device can exist. The TDM slot pulse P is a timing reference signal that identifies the boundaries of each TDM time slot S. The TDM frame start pulse P, identifies the boundaries of an entire TDM frame F.

Figure 5:
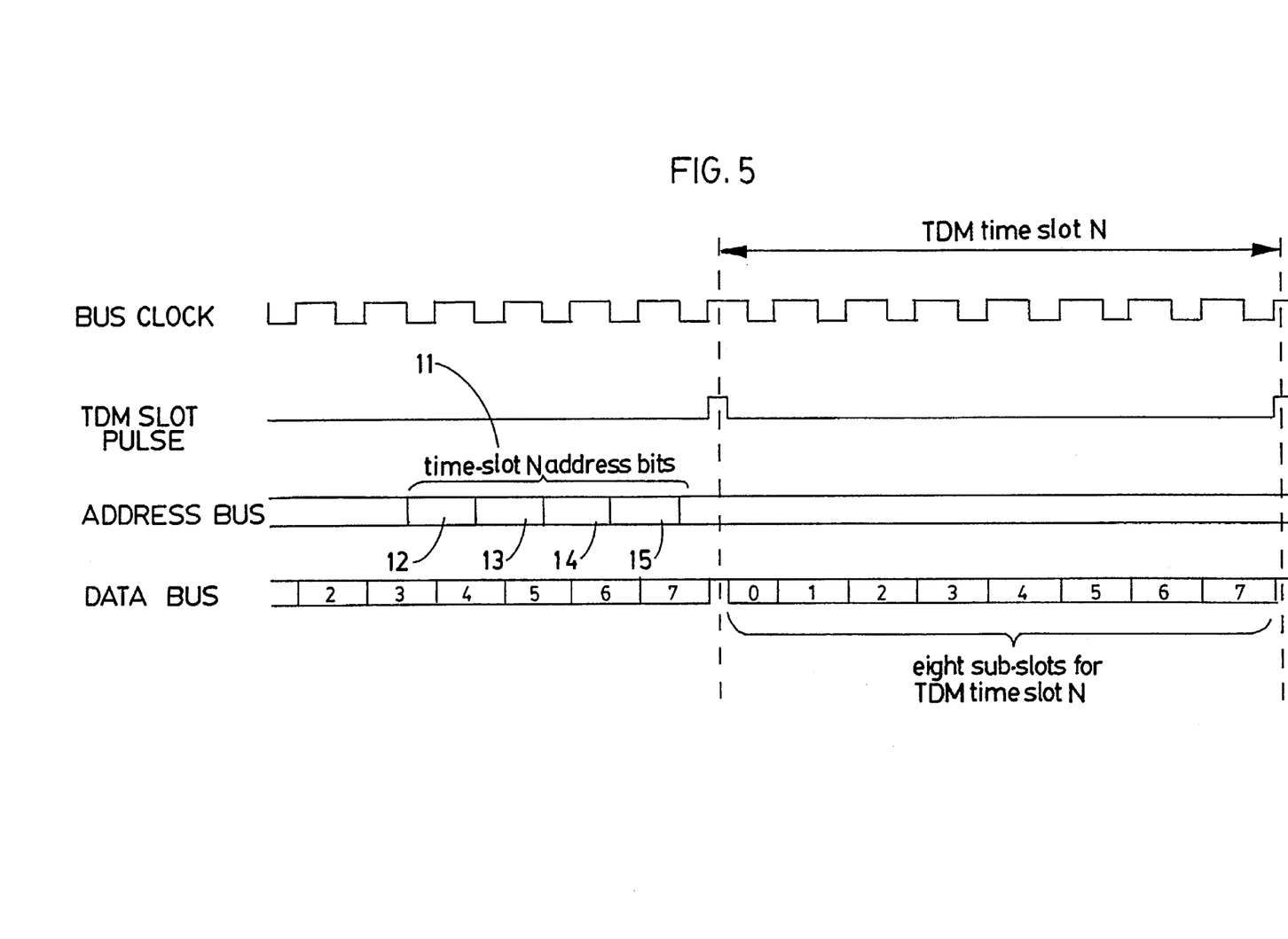
FIG. 5 is a timing diagram showing the format and pipelining of address and data during a single TDM time slot in the preferred embodiment of the present invention.

FIG. 5 is a more detailed timing diagram showing bus operation during a single time slot S. One particular implementation of the TDM bus TDM of the preferred embodiment further divides each time slot S into eight "sub-slots" 100 to allow the transfer of a very long word length data over a limited number of physical data bus wires. Similarly, the address bus transfers the address information in pieces 11 consisting of the source high address 12 followed by the source low address 13 followed by the destination high address 14 and the destination low address 15.

A TDM bus TDM of the preferred embodiment operates as follows during time slot N:

During time slot N−1 the address information is preloaded into the input register portion of the four pipeline registers 20, 21, 22, 34. Each pipeline register consists of an input and output register in series. The output register holds stable address values that have previously been stored and are used during the current time slot N data transfer.

The input registers load the address values that are being passed across the address bus for the next time slot N (see FIG. 5). At the boundary between time slots, the contents of the input registers are transferred to the output registers.

The TDM bus device 1, 2 or 8 operates as a data source as follows:

At the start of the time slot, the pipeline registers will update their outputs with the new address values. The TDM bus device will recognize that it is the source for the transfer when the output of the source address comparator 23 indicates a match with the local TDM address constant 30.

In this case, the output drivers 26 will be turned on, driving the data bus from the local memory 27. The multiplexer 35 will select the source low address pipeline register 22 to drive the local memory 27. In the preferred embodiment, it is illegal to address the same device as both the source and destination during a single time slot.

Similarly, when the TDM bus device is a destination device without group mode addressing in effect, the destination address comparator 24 will indicate a match and the drivers 25 will be turned on to get the data on the TDM data bus TDM and write it into local memory 27.

In this case, the multiplexer 35 will select the destination low address pipeline register 34 to drive the local memory 27 address. In all cases, the local control signal generator 29 generates local clocks and strobes that cause the pipeline registers to be loaded in the proper sequence as well as breaking up the data transfer into a number of "sub-time slots" 100.

When a group destination address is received by the TDM bus device 1, 2 or 8, the operation is identical to when a single destination address is sent except that the group address comparator 31 determines whether the TDM bus device 1, 2 or 8 is being addressed instead of the destination address comparator 24. The OR gate logic 33 causes the TDM bus device 1, 2 or 8 to respond in the same way whether it is being addressed as a single destination or group.

The particular embodiment described above is but one of several different decoding schemes possible for recognizing group addresses. With a slightly more complex group address decoder, addressing schemes could easily be employed that yield more than four distinct groups for the same number of address bits. For instance, instead of each bit representing a group, the four bits could be encoded together to represent 16 groups. In this case, the group address mask register would indicate which of the 16 groups is being addressed.

Figure 9:
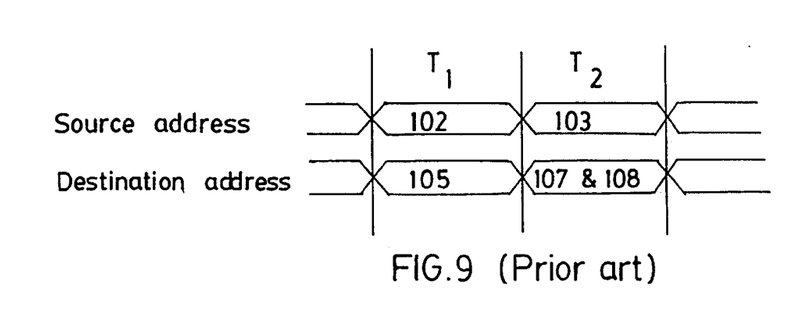
FIG. 9 is a functional timing diagram illustrating how the preferred embodiment of the present invention applies a TDM bus and time division multiplexing to implement the data transfers of the patch bay of FIG. 1.

FIG. 9 illustrates how the preferred TDM bus system implements the patch bay connections of FIG. 6 in the digital audio data transfer environment of the preferred embodiment of the present invention. The preferred TDM bus TDM allows digital audio devices with the circuitry of FIGS. 2–3 to be simply plugged into the TDM bus TDM of FIG. 1.

Furthermore, in addition to applying time division multiplexing in a digital audio/patch bay data transfer environment, the preferred embodiment of the present invention applies an improved time division multiplexing system which allows multiple destination devices to receive data simultaneously during a single time slice. As shown in FIG. 9, applying the circuitry of the preferred embodiment to the patch bay devices of FIG. 6, a group address "107 & 108" that includes devices 107 and 108, allows transfers to those two devices in a single time slot instead of several separate time slots. For multiple connections that drive a lot of inputs, this technique can result in large savings of bus bandwidth.

Those skilled in the art will appreciate that various adaptations and modifications of the just described preferred embodiments can be used and configured without departing from the scope and spirit of the invention. Therefore, it is to be understood that, within the scope of the appended claims, the invention may be practiced other than as specifically described herein.

What is claimed is:

1. A time division multiplexing digital audio patch bay data transfer system for transferring data during a series of time slots, the system comprising:

(a) a digital audio data bus interconnection structure including a data bus;

(b) a plurality of digital audio processing devices, each digital audio processing device having connections plugged into the bus structure for allowing input and output data communication with the bus structure, the bus structure providing data transfer from a source digital audio processing device to a destination digital audio processing device during a single time slot; and (c) a bus control means for providing control signals to the bus structure, the control signals controlling which of the digital audio processing devices are the source digital audio processing device and the destination digital audio processing device during the single time slot; and wherein each of the digital audio processing devices further comprises (1) a group address means for controlling access to the data bus when a group address control signal is provided by the bus control means to address a plurality of destination devices, and (2) a single address means for controlling access to the data bus when a single address control signal is provided by the bus control means to address a single destination device such that each digital audio processing device will receive data if it sees its own unique address or the address of any group to which it belongs, and wherein there are a plurality of destination digital audio processing devices receiving data during the single time slot.

2. The patch bay system of claim 1, wherein the bus control means includes a TDM bus control unit and a connection table, the connection table storing address data describing the source device and destination device for each data transfer.

3. The patch bay system of claim 1, wherein the bus structure has a data bus, a control bus and an address bus.

4. The patch bay system of claim 3, wherein each digital audio processing device further comprises a first pipeline register means and a second pipeline register means, the pipeline register means receiving address coding from the address bus, the first pipeline register means receiving coding determinative of whether the processing device is to access the data bus and the second pipeline register means receiving coding describing where the processing device should access user data.

5. The patch bay system of claim 4, wherein each pipeline register means includes a source register means for accessing the processing device as a source of the user data and a destination register means for accessing the processing device as a destination of the user data.

6. The patch bay system of claim 4, wherein each of the register means includes two registers connected in series to provide a coordinated delayed transfer data such that a user data transfer occurs in a next time slot following the time slot of receipt of the address coding information.

7. The patch bay system of claim 1, further comprising a group address comparator for determining whether address control signal is a group address control signal or a single address control signal.

8. The patch bay system of claim 1, wherein the digital audio processing devices further comprise a group address mask register for holding coding signals determining which of a plurality of groups the processing device belongs.

9. The patch bay system of claim 1, wherein the digital audio processing devices further comprise a local processor means which controls communication of data to external audio devices.

10. A digital audio processing device which mates with an external bus structure including a data bus and controlled by an external bus controller, comprising:

(a) input and output connections plugged into the external bus structure, the input and output connections allowing input or output communications with the bus structure during a single time slot; and (b) a group address means for controlling access to the data bus when a group address control signal identifying a plurality of destination devices is received from the external bus controller and a single address means for accessing the data bus when a single address control signal identifying a single destination device is received from the external bus controller; and further comprising a first pipeline register means and a second pipeline register means, the pipeline register means receiving address coding from an address bus, the first pipeline register means receiving coding determinative of whether the processing device is to access the data bus and the second pipeline register means receiving coding describing where the processing device should access data, and wherein each of the register means includes two registers connected in series to provide a coordinated delayed transfer data such that a data transfer occurs in a next time slot following the time slot of receipt of the address coding information.

11. The device of claim 10, wherein each pipeline register means includes a source register means for addressing the processing device as a source of the data and a destination register means for addressing the processing device as a destination of the data.

12. The device of claim 10, further comprising a group address comparator for determining whether an address control signal is a group address control signal or a single address control signal.

13. The device of claim 10, further comprising a group address mask register for holding coding signals determining which of a plurality of groups the processing device belongs to.

14. The device of claim 10, further comprising a local processor means which controls communication of data to over at least one communication channel to external audio devices.

15. A time division multiplexing communication system, comprising:

(a) a digital data bus interconnection structure;

(b) a plurality of digital processing devices, each digital processing device having connections plugged into the bus structure for allowing input and output data communication with the bus structure, the bus structure providing data transfer from a source digital processing device to at least one destination digital processing device during a single time slot;

(c) a bus control means for providing control signals to the bus structure, the control signals controlling which of the digital processing devices are the source digital audio processing device and the destination digital audio processing device during the single time slot, and wherein there are a plurality of destination digital audio processing devices receiving data during the single time slot; and (d) wherein the digital processing devices further comprise a group address means for controlling access to the data bus when a group address control signal identifying a group of destination devices is provided by the bus control means and a single address means for accessing the data bus when a single address control signal identifying a single destination device is provided by the bus control means, such that each digital processing device will receive data if it sees its own unique address or the address of any group to which it belongs.

16. The system of claim 15, wherein the bus structure has a data bus, a control bus and an address bus.

17. The patch bay system of claim 1, wherein the recipient devices belong to a plurality of groups.

18. The device of claim 10, wherein the group address means allows access to the data bus upon receiving one of a plurality of group address counter signals.

19. The system of claim 15, wherein each destination device is allowed access to the data bus when a plurality of group address control signals are received.

* * * * *